United States Patent
Lindsay et al.

(10) Patent No.: US 6,754,670 B1
(45) Date of Patent: Jun. 22, 2004

(54) MAPPING RELATIONAL TABLES TO OBJECT ORIENTED CLASSES

(75) Inventors: Anthony D. Lindsay, Toronto (CA); Michael G. Polan, Ajax (CA); Tack Tong, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/467,297

(22) Filed: Dec. 17, 1999

(51) Int. Cl.[7] .............................................. G06F 17/00
(52) U.S. Cl. ...................... 707/103; 707/100; 707/102; 707/104
(58) Field of Search .......................... 707/4, 100, 102, 707/103, 104; 717/104; 345/763

(56) References Cited

U.S. PATENT DOCUMENTS

| | | | | |
|---|---|---|---|---|
| 4,425,615 A | | 1/1984 | Swenson et al. ............. 711/114 |
| 5,426,780 A | * | 6/1995 | Gerull et al. ................ 707/100 |
| 5,499,371 A | | 3/1996 | Henninger ................... 717/108 |
| 5,522,054 A | | 5/1996 | Gunlock et al. ............. 711/112 |
| 5,548,795 A | | 8/1996 | Au ............................... 710/52 |
| 5,596,746 A | | 1/1997 | Shen ........................... 707/101 |
| 5,627,979 A | * | 5/1997 | Chang et al. ................ 345/763 |
| 5,694,598 A | | 12/1997 | Durand ........................ 707/103 |
| 5,878,411 A | * | 3/1999 | Burroughs et al. ............. 707/4 |
| 5,956,730 A | * | 9/1999 | Burroughs et al. .......... 707/104 |
| 6,047,284 A | * | 4/2000 | Owens et al. .................. 707/4 |
| 6,076,090 A | * | 6/2000 | Burroughs et al. .......... 707/102 |
| 6,085,198 A | * | 7/2000 | Skinner et al. ............. 707/103 |
| 6,101,502 A | * | 8/2000 | Heubner et al. ............ 707/103 |
| 6,163,776 A | * | 12/2000 | Periwal ......................... 707/4 |
| 6,163,781 A | * | 12/2000 | Wess, Jr. ..................... 707/103 |
| 6,175,837 B1 | * | 1/2001 | Sharma et al. ............. 707/103 |
| 6,199,195 B1 | * | 3/2001 | Goodwin et al. ........... 717/104 |
| 6,240,422 B1 | * | 5/2001 | Atkins et al. ............... 707/102 |
| 6,317,748 B1 | * | 11/2001 | Menzies et al. ............ 707/103 |
| 6,341,289 B1 | * | 1/2002 | Burroughs et al. .......... 707/104 |

OTHER PUBLICATIONS

Uehara et al., "A Framework of Customizing Transactions in Persistent Object Management for Advanced Applications", IEEE, 1995, pp. 84–93.*

* cited by examiner

*Primary Examiner*—Thuy N. Pardo
(74) *Attorney, Agent, or Firm*—Ohlandt, Greeley, Ruggiero & Perle, L.L.P.; Ingrid Foerster

(57) ABSTRACT

A computer system providing a framework for mapping relational tables to object oriented classes. The framework includes an attribute class for defining data corresponding to columns in a relational table and including data objects used to map between the relational table and a programmer-defined object oriented class. The attribute class also including flags used to indicate modifications to the data. The framework further includes a generator class providing methods for generating SQL text corresponding to the relational table as defined in the attribute class objects for a given table.

9 Claims, 1 Drawing Sheet

MAPPING RELATIONAL TABLES TO OBJECT ORIENTED CLASSES

FIELD OF THE INVENTION

The present invention is directed to an improvement in computing systems and in particular to computer systems which provide for the mapping of relational tables to object oriented classes.

BACKGROUND OF THE INVENTION

Data is often stored in relational database systems. Such relational database systems model the data as tables and offer relational operators such as SELECT, INSERT, UPDATE and DELETE for data manipulation. Relational database systems are frequently used as "backend" systems which are in turn accessed by another computer program or system application which accesses the data in the relational database tables. This access may be accomplished by the other application including code which directly uses the application program interface (API) of the relational database in which the data is stored. For the relational database to be accessed directly in this way the programmer writing the application must have knowledge of the underlying API for the relational database. Typically, such code in the application program is written specifically for a given structure of database and therefore when the database is changed in some way the code must also be changed. It is now quite common for object oriented applications to access relational database backend systems. For a programmer writing in an object oriented environment it is advantageous to be able to model the data as object oriented classes, rather than to require the programmer to have knowledge of the details of the relational database being accessed. With the increasing popularity of object oriented styles of programming, such a mapping of relational tables to classes is relatively common. One approach to this mapping is to store the relational database operators and definitions statically in defined classes in the object oriented system. Classes are defined on a table by table basis and operations for the classes are defined in relation to the structure of the tables mapped. Such a system has limited flexibility. In addition, the implementation of relational operators in the object oriented system will often result in inefficient relational operations being carried out. For example, an object oriented implementation of a relational UPDATE operator may result in a global update (all fields are updated) where a more selective update may be appropriate and potentially be more efficient.

An example of the prior art approach is found in U.S. Pat. No. 5,694,598 (Durand) which discloses a method for mapping data between object oriented object and a relational database. The method disclosed requires the generation of a transit object from objects in the object oriented environment and populating the transit object with data which is then used to populate a relational database. The mapping may also be carried out in reverse.

Another prior approach to the mapping between relational tables and object oriented constructs is provided in U.S. Pat. No. 5,499,371 (Henninger). The method disclosed in that patent requires the definition of an object model which represents the structure of a given relational database table. This object model is used in conjunction with a database schema and transform to create the mapping between the relational table and the object oriented environment.

Another approach is found in U.S. Pat. No. 5,596,746 (Shen) which discloses the use of meta models of database tables to permit relational tables to be mapped to an object model representation.

The prior art approaches require specific data constructs such as transit objects, object models and meta models for the mapping of the relational data to the object oriented environment. Such approaches potentially constrain the object oriented programmer in developing or modifying object oriented models for mapping relational tables.

It is therefore desirable to have a computer system which will permit the mapping of relational database tables to object oriented classes where the object oriented system retains flexibility to accommodate changes in the relational database and which has increased efficiency.

SUMMARY OF THE INVENTION

According to one aspect of the present invention, there is provided an improved system for mapping relational database tables to object oriented classes.

According to another aspect of the present invention, there is provided a computer system framework for mapping relational database tables to object oriented classes, the framework including an attribute class for mapping data values from a relational table column to values in an object oriented environment, the attribute class comprising data objects representing data types, a data object for data from the relational table, and methods to access the data objects in the attribute class, a generator class for providing methods to permit the generation of SQL statements for relational tables defined by attribute class objects, whereby a programmer may define a table class corresponding to a relational table, the table class using the attribute class and the generator class of the framework to define the columns of the table in the object oriented environment and to define specific operations on the relational table.

According to another aspect of the present invention, there is provided the above framework in which the data objects representing data types in the attribute class comprise a column name object, an SQL type object and an object oriented mapping type object.

According to another aspect of the present invention, there is provided the above framework in which the attribute class further includes data object flags comprising an index flag indicating whether the relational table column mapped by the attribute class object is part of a target index for a given SQL statement.

According to another aspect of the present invention, there is provided the above framework in which the attribute class further includes data object flags comprising a modified flag indicating whether the attribute value in the attribute class object has been modified.

According to another aspect of the present invention, there is provided the above framework in which the attribute class further includes data object flags comprising a bindable flag indicating whether the attribute value in the attribute class object is to be bound to a parameter marker for a given SQL statement, and an associated update string data object comprising an SQL fragment to be bound to the parameter marker where the attribute value is not to be so bound.

According to another aspect of the present invention, there is provided the above framework in which the generator class includes methods to generate text for SQL statements comprising SELECT, INSERT, UPDATE, and DELETE and further includes methods to bind values to the statements passed to the relational table database.

According to another aspect of the present invention, there is provided the above framework in which the methods to generate the SELECT statement further includes a method to extract values from a fetched row of a relational table for use in a corresponding attribute class object.

According to another aspect of the present invention, there is provided a computer program product for use with a computer comprising a central processing unit and random access memory, said computer program product comprising a computer usable medium having computer readable code means embodied in said medium providing a framework for the mapping of relational data tables to object oriented classes, said computer program product comprising computer readable program code means the above framework.

According to another aspect of the present invention, there is provided a computer program product tangibly embodying a program of instructions executable by a computer for providing the above framework for the mapping of relational data tables to object oriented classes.

According to another aspect of the present invention, there is provided a method for mapping relational database tables to object oriented classes, the method comprising the following steps:

defining an attribute class for mapping data values from a relational table column to values in an object oriented environment, the attribute class comprising data objects representing data types, a data object for data from the relational table, and methods to access the data objects in the attribute class, defining a generator class for providing methods to permit the generation of SQL statements for relational tables defined by attribute class objects, defining a table class corresponding to a relational table, the table class using the attribute class and the generator class of the framework to define the columns of the table in the object oriented environment and to define specific operations on the relational table.

Advantages of the present invention include the fact that use of the framework of the invention permits object oriented code to be written in a flexible and powerful way to permit accesses to relational database tables without the programmer relying on knowledge of details of the underlying database table.

BRIEF DESCRIPTION OF THE DRAWINGS

The preferred embodiment of the invention is shown in the drawings, wherein.

DETAILED DESCRIPTION OF THE PREFERRED EMBODIMENT

Figure 1:
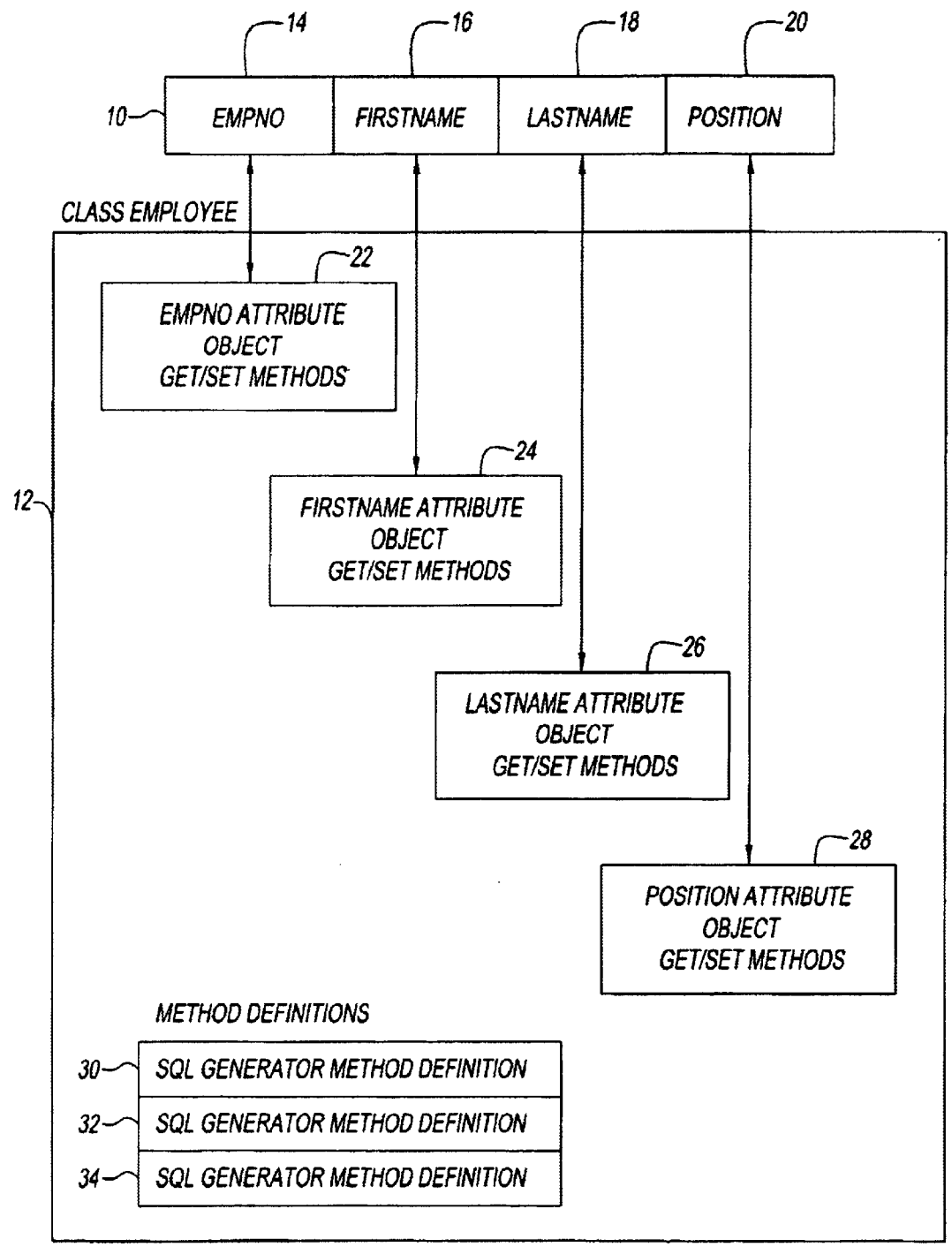
FIG. 1 is a schematic diagram representing the mapping from an example relational table to an example object oriented class in accordance with the preferred embodiment. In the drawings, the preferred embodiment of the invention is illustrated by way of example. It is to be expressly understood that the description and drawings are only for the purpose of illustration and as an aid to understanding, and are not intended as a definition of the limits of the invention.

The mapping of the preferred embodiment is illustrated by way of the example shown in the block diagram of FIG. 1. FIG. 1 shows an example relational database table 10 with the name Employee. An object oriented class into which table 10 is mapped is shown in FIG. 1 as class 12, also named Employee. Table 10 has columns 14, 16, 18, 20, named Empno, Firstname, Lastname and Position, respectively.

As is described in greater detail below, the system of the preferred embodiment permits table 10 to be mapped into class 12 by the creation of an object of type attribute for each column in table 10. Associated with each object of type attribute is a pair of methods, to get and set values of the attribute object. This is shown in the example of FIG. 1 by the mapping from Empno column 14 to Empno attribute object and associated get/set methods 22. Similarly Firstname column 16 is mapped by Firstname attribute object and associated get/set methods 24. Lastname column 18 and Position column 20 are in the same way mapped to Lastname and Position attribute objects and associated methods 26, 28, respectively.

The example of FIG. 1 also illustrates the fact that the preferred embodiment supports the definition of methods 30, 32, 34 in class 12 which implement specific relational operations on the relational data, as is described in more detail below.

In the preferred embodiment, the relational database is an SQL relational DBMS. The examples provided are in the Java object oriented programming language. As will be apparent to those skilled in the art the object oriented framework provided in the preferred embodiment may be implement in other object oriented languages and other relational DBMSs may be mapped by the preferred embodiment.

The preferred embodiment as implemented in Java makes use of the Java extension JDBC™ which provides an API to permit Java programs to access SQL relational database tables. JDBC™ includes, for example, a method for executing defined queries on an SQL data table.

The object oriented framework of the preferred embodiment provides two classes which are available to map relational database tables. The first class (named attribute in the preferred embodiment) handles the mapping of the database column to the class property. The second class uses this mapping class (attribute) to generate the SQL code for use by the relational DBMS, bind parameters and retrieve values from the result sets.

An instance of the attribute class is used to map data values from a column in a given relational database table. The attribute class defines the following data:

column name: This is the name of the relational database column which is mapped by the instance of the attribute class;

SQL type: This is the data type of the mapped SQL column;

object oriented mapping type: This is the data type in the object oriented environment into which the SQL type is mapped;

index flag: This is a flag which indicates whether the column in the database table is part of the target index for a given SQL statement;

modified bit flag: This is a flag which indicates that the object oriented application has modified the attribute value and that when the corresponding SQL statement is generated, there will be a change to the corresponding column in the relational table. Use of the modified bit permits SQL statements to be generated which are more efficient by updating only those aspects of the table required to be updated by the modified bit flag.

bindable flag: This flag indicates if a parameter marker should be used and if so the attribute value will be bound to the parameter marker in the SQL statement generated.

update string: This data is used when an SQL fragment (the update string) is to be used for a parameter marker instead of the attribute value.

object oriented value: This represents the actual value of the data in the column of the table in the database.

The attribute class contains information which is used when SQL statements are generated and passed to the DBMS. It also contains information which is of use when the database table data is to be used in the object oriented system. For the database side the SQL type and name of column are important. For the object oriented side it is important to know what data type to map the column to.

Defined in the attribute class for the preferred embodiment is a set of methods to set and get the data values encapsulated in the class. The implementation of such methods will be apparent to those skilled in the art. An example of such a method is the method setKey( ) which is takes a Boolean parameter and sets the index flag in accordance with the parameter passed to it.

The second class in the framework of the preferred embodiment is the SQLGenerator class. This class encapsulates table name and attribute list data. In the preferred embodiment the SQLGenerator class contains methods for manipulating the following SQL statements: SELECT, INSERT, UPDATE, DELETE. Methods are defined in the preferred embodiment to generate text which corresponds to each of the four SQL operators listed above. Methods are also defined which populate the SQL statements—values are bound to statements generated by the methods defined in the SQLGenerator class.

The implementation of the methods set out below will be apparent to one skilled in the art for a given set consisting of a relational DBMS, an object oriented environment, and connection objects defining an interface between the two.

The following methods are defined in the framework of the preferred embodiment for the SQL SELECT statement:

generateSelect( ): returns a select statement (String) based on the index as defined by the index flags set to true in the attributes defined for a mapped table;

populateSelect (Statement Handle): binds the attribute value to the WHERE clause of the SELECT statement identified by the Statement Handle. A statement handle is an object returned by the prepareStatement method of the JDBC class.

extractValues (Result Set): extracts the properties from the currently fetched row in the result set. A result set is an object returned from the executeQuery method of the PreparedStatement class in JDBC.

The following methods are defined in the framework of the preferred embodiment for the SQL UPDATE statement:

generateupdate( ): returns a update statement (String) based on the defined index and the modified properties as indicated by the appropriate flag in the attribute objects for the columns in the table.

populateUpdate (Statement Handle): binds the values to the statement identified by the Statement Handle.

Similarly, the following methods are defined for the SQL INSERT and DELETE statements:

generateInsert( ): returns an insert statement (String) based on the modified properties;

populateInsert (Statement Handle): binds the values to the statement generated in the previous method.

generateDelete( ): returns a delete statement based on the defined index;

populateDelete (Statement Handle): binds the values to the statement generated in the previous method.

The above two classes define the framework of the preferred embodiment. The framework may be used to map a relational database table and the operations on the table in a way which provides functionality and flexibility in the object oriented environment without the need for a programmer writing object oriented code to know about the SQL DBMS details. An example of how the framework may be used to map a table is given below with reference to the table represented in FIG. 1.

The SQL table in FIG. 1 has the following definition:

TABLE

| EMPLOYEE | |
|---|---|
| Column Name | SQL Type |
| Empno | INTEGER |
| Firstname | CHAR(15) |
| Lastname | CHAR(20) |
| Position | VARCHAR(128) |
| HireDate | DATE |

A class mapping of the table may be implemented using the framework of the preferred embodiment by defining a public class Employee (shown as class 12 in FIG. 1) with the following class constructor definition:

```
public Employee ( )
{
Attribute attributes [ ] = new Attribute [ ]
    {empno, firstname, lastname, position, hireDate};
generator = new SQLGenerator("EMPLOYEE", attributes);
}
```

Each column in the table has an object defined in the Employee class and a pair of get and set methods defined (as shown in FIG. 1 as object and get/set methods 22, 24, 26, 28). For example, method definition and object instantiation for the Empno attribute may be implemented as follows:

public Integer getEmpno( ) {return (Integer) empno.getValue( ); }
public void setEmpno (Integer empno) {this.empno.setValue(empno);}
private Attribute empno=new Attribute(Types.INTEGER, "Empno", Integer.class);

Similar pairs of methods and object definitions are created by the object oriented programmer for the other columns in the table of the SQL DBMS in a similar manner. The result is that each column of the EMPLOYEE table is mapped by an attribute object in the Employee class. The flexibility of the framework permits other columns to be easily added to the class without extensive knowledge of the underlying SQL table.

Further methods are then defined in the Employee class to permit operations to be carried out on the relational database table (shown as SQLGenerator method definitions 30, 32, 34 in FIG. 1). An example of such a method definition is given below, where connection is an object which permits connection to the database as provided by JDBC™, and PreparedStatement, ResultSet and executeQuery( ) are similarly provided by JDBC™:

public boolean retrieveByEmpno( ) throws DBException

```
{
synchronized (this) {
try {
    empno.setKey (true);
    String selectStatemtn = generator.generateSelect( );
    PreparedStatement stmt =
    connection.prepareStatement(selectStatement);
    generator.populateSelect(stmt);
```

-continued

```
        ResultSet rs = stmt.executeQuery( );
        if (!rs.next( )) return false;
        generator.extractValues(rs);
        rs.close( );
        stmt.close( );
    }
    catch (Throwable exc)
        throw new DBException(exc);
    }
    finally {
        empno.setKey(false);
    }
```

The above method definition provides a mechanism in the object oriented environment to retrieve a row from the EMPLOYEE table based on a given employee number. As can be seen, use of the framework of the invention permits the object oriented code to be written with little knowledge of the underlying database table. Property mappings are similarly carried out by the methods which are supplied by the framework of the invention. The code which carries out the interface between the object oriented environment and the relational DBMS is contained in the framework class definitions and therefore the code written by the object oriented programmer in mapping the table to the object oriented class is reduced.

The use of the modified bit in the attribute class permits the update and insert methods to only update the properties which have, in fact, changed, as is indicated by the flag for the respective objects which map the columns for the table.

As the above example also indicates, the statement handle is made available to the object oriented programmer (this database construct is not hidden in the framework classes). This results in the programmer being able to take advantage of DBMS caching for greater efficiency in the code written to implement SQLGenerator methods.

Although a preferred embodiment of the present invention has been described here in detail, it will be appreciated by those skilled in the art, that variations may be made thereto, without departing from the spirit of the invention or the scope of the appended claims.

The embodiments of the invention in which an exclusive property or privilege is claimed are defined as follows:

1. A computer system framework for mapping relational database tables to object oriented classes, the framework comprising:

an attribute class for mapping data values from a relational table column to values in an object oriented environment, the attribute class comprising data objects representing data types, a data object for data from the relational table, and methods to access the data objects in the attribute class, wherein the attribute class defines the run-time mapping between the relational table column and the entity class attributes;

a generator class for providing methods to permit the generation of SQL statements for relational tables defined by the attribute class data objects, wherein the generator class is an active object for the run-time, dynamic generation of the SQL statements used to access the relational data, such that the SQL statements are not constrained by schema mapping used to generate the data objects;

whereby mapping can be modified during client program execution and the programmer may define a table class corresponding to a relational table, the table class using the attribute class and the generator class of the framework to define the columns of the table in the object oriented environment and to define specific operations on the relational table.

2. The framework of claim 1, in which the data objects representing data types in the attribute class comprise a column name object, an SQL type object and an object oriented mapping type object.

3. The framework of claim 1, in which the attribute class further includes data object flags comprising an index flag indicating whether the relational table column mapped by the attribute object is part of a target index for a given SQL statement.

4. The framework of claim 1 in which the attribute class further includes data object flags comprising a modified bit flag indicating whether the attribute value for the attribute class object has been modified.

5. The framework of claim 1 in which the attribute class further includes data object flags comprising a bindable flag indicating whether the attribute value should be bound to the parameter marker for a given SQL statement, and an associated update string data object comprising an SQL fragment to be bound to the parameter marker in the place of the attribute value.

6. The framework of claim 1 in which the generator class includes methods to generate text for SQL statements comprising SELECT, INSERT, UPDATE, and DELETE and further comprises methods to bind values to the statements passed to the relational table database.

7. The framework of claim 6 in which the methods to generate the SELECT statement further comprises a method to extract values from a fetched row of a relational table for use in a corresponding attribute class object.

8. A computer system framework for mapping relational database tables to object oriented classes, the framework comprising:

an attribute class for mapping data values from a relational table column to values in an object oriented environment, the attribute class comprising:

data objects representing data types, the data objects representing data types comprising a column name object, an SQL type object and an object oriented mapping type object;

a data object for data from the relational table;

data object flags comprising an index flag indicating whether the relational table column mapped by the attribute class object is part of a target index for a given SQL statement;

a modified bit flag indicating whether the attribute value in the attribute class object has been modified;

a bindable flag indicating whether the attribute value for the attribute class object is to be bound to a parameter marker for a given SQL statement, and an associated update string data object comprising an SQL fragment to be bound to the parameter marker where the attribute value is not to be bound, and methods to access the data objects in the attribute class, wherein the attribute class defines the runtime mapping between the relational table column and the entity class attributes a generator class comprising:

methods to generate SQL statements comprising SELECT, INSERT, UPDATE, and DELETE, and methods to bind values to the SQL statements passed to the relational table database, the methods to generate the SELECT statement further comprising a method to extract values from a fetched row of a relational table for use in a corresponding attribute class object, wherein the generator class is an active object for the runtime, dynamic generation of the SQL statements used to access the relational data;

whereby mapping can be modified during client program execution and the programmer may define a table class corresponding to a relational table, the table class using the attribute class and the generator class of the framework to define the columns of the table in the object oriented environment and to define specific operations on the relational table.

9. A computer program product tangibly embodying a program of instructions executable by a computer for providing the framework of claim 8.

\* \* \* \* \*